United States Patent
Malik et al.

(10) Patent No.: US 12,347,044 B2
(45) Date of Patent: Jul. 1, 2025

(54) REMOTE MULTIPARTICIPANT AUGMENTED REALITY

(71) Applicant: Jadu AR Inc., Los Angeles, CA (US)

(72) Inventors: Asad J. Malik, Los Angeles, CA (US); René Damm, Los Angeles, CA (US); Jack Gerrard, Los Angeles, CA (US); Kyle Weisgarber, Los Angeles, CA (US); Cameron Faith, Los Angeles, CA (US); Jake Sally, Los Angeles, CA (US)

(73) Assignee: Jadu AR Inc., Los Angeles, CA (US)

( * ) Notice: Subject to any disclaimer, the term of this patent is extended or adjusted under 35 U.S.C. 154(b) by 0 days.

(21) Appl. No.: 18/403,548

(22) Filed: Jan. 3, 2024

(65) Prior Publication Data

US 2024/0233284 A1 Jul. 11, 2024

Related U.S. Application Data

(60) Provisional application No. 63/479,297, filed on Jan. 10, 2023.

(51) Int. Cl.
*G06T 19/00* (2011.01)
*G06V 10/24* (2022.01)

(52) U.S. Cl.
CPC ............ *G06T 19/006* (2013.01); *G06V 10/24* (2022.01); *G06T 2219/024* (2013.01)

(58) Field of Classification Search
CPC .. G06T 19/006; G06T 2219/024; G06V 10/24
See application file for complete search history.

(56) References Cited

U.S. PATENT DOCUMENTS

| | | | | |
|---|---|---|---|---|
| 8,914,472 | B1* | 12/2014 | Lee | G06Q 30/04 |
| | | | | 709/219 |
| 9,691,184 | B2* | 6/2017 | Blanchflower | G06T 11/60 |
| 10,338,392 | B2* | 7/2019 | Kohler | G06F 3/017 |
| 11,138,803 | B1* | 10/2021 | Abdel-Wahab | G06F 3/011 |
| 11,410,360 | B2* | 8/2022 | Ruth | G06F 3/011 |
| 11,527,171 | B2* | 12/2022 | Freiwirth | A63F 13/216 |

(Continued)

FOREIGN PATENT DOCUMENTS

| | | |
|---|---|---|
| EP | 1060772 A2 | 12/2000 |
| EP | 3517190 A2 | 7/2019 |

OTHER PUBLICATIONS

Billinghurst et al., Mixed Realities in Shared Space: An Augmented Reality Interface for Collaborative Computing, 2000 IEEE International Conference on Multimedia and Expo, pp. 1641-1644 (Year: 2000).*

(Continued)

*Primary Examiner* — Motilewa Good-Johnson
(74) *Attorney, Agent, or Firm* — Pillsbury Winthrop Shaw Pittman, LLP

(57) ABSTRACT

Provided is a method of establishing a remote multiparticipant augmented reality session such that participants in the remote multiparticipant augmented reality session are at different locations and are in different physical environments. Augmented reality objects may be populated in a shared virtual space that has components of both physical environments and some of those augmented reality objects are controlled by the remote participant by exchanging participant state information.

19 Claims, 5 Drawing Sheets

(56) References Cited

U.S. PATENT DOCUMENTS

| | | | | |
|---|---|---|---|---|
| 11,568,605 | B2* | 1/2023 | Shahrokni | G06T 19/006 |
| 11,722,537 | B2* | 8/2023 | Andon | G06T 19/003 |
| | | | | 709/204 |
| 11,782,669 | B2* | 10/2023 | Pahud | A63F 13/26 |
| | | | | 345/2.2 |
| 11,861,799 | B2* | 1/2024 | Laaksonen | H04L 12/1818 |
| 2013/0263017 | A1* | 10/2013 | Moyers | H04L 65/403 |
| | | | | 715/753 |
| 2018/0004286 | A1* | 1/2018 | Chen | G06F 3/0481 |
| 2018/0005429 | A1* | 1/2018 | Osman | A63F 13/56 |
| 2018/0060333 | A1* | 3/2018 | Bosch | G06F 3/011 |
| 2018/0210628 | A1 | 7/2018 | McPhee et al. | |
| 2019/0313059 | A1* | 10/2019 | Agarawala | G06F 3/011 |
| 2020/0184217 | A1* | 6/2020 | Faulkner | G06T 7/50 |
| 2020/0261799 | A1 | 8/2020 | Cahill et al. | |
| 2021/0110610 | A1* | 4/2021 | Xu | G06V 20/20 |
| 2021/0327140 | A1* | 10/2021 | Rothkopf | G06T 13/205 |
| 2022/0130116 | A1* | 4/2022 | McCall | H04N 13/344 |
| 2022/0198758 | A1* | 6/2022 | Laaksonen | H04L 12/1818 |
| 2023/0127303 | A1* | 4/2023 | Shahrokni | G06T 15/00 |
| | | | | 345/419 |
| 2023/0164223 | A1* | 5/2023 | Lee | H04L 67/131 |
| | | | | 709/204 |
| 2023/0196681 | A1* | 6/2023 | Madden | G08B 21/02 |
| | | | | 345/419 |
| 2023/0298247 | A1* | 9/2023 | Tham | H04N 23/90 |
| | | | | 345/633 |
| 2023/0350628 | A1* | 11/2023 | Pahud | H04L 12/1827 |
| 2023/0353616 | A1* | 11/2023 | Andon | H04W 4/021 |
| 2023/0388453 | A1* | 11/2023 | Chalmers | G06F 3/012 |
| 2024/0077933 | A1* | 3/2024 | Kim | G06F 3/017 |
| 2024/0161411 | A1* | 5/2024 | Galardo | G06T 19/00 |

OTHER PUBLICATIONS

Billinghurst et al., "Mixing realities in Shared Space: an augmented reality interface for collaborative computing," 2000 IEEE International Conference on Multimedia and Expo. ICME2000. Proceedings. Latest Advances in the Fast Changing World of Multimedia (Cat. No. 00TH8532) (Year: 2000).*

International Search Report and Written Opinion for related International Patent Application PCT/US2024/011047 issued on May 20, 2024, 10 pages.

* cited by examiner

REMOTE MULTIPARTICIPANT AUGMENTED REALITY

CROSS-REFERENCE TO RELATED APPLICATIONS

This patent claims the benefit of U.S. Provisional Patent Application 63/479,297, titled REMOTE MULTIPARTICIPANT AUGMENTED REALITY, filed 10 Jan. 2023. The entire content of the aforementioned patent filing is hereby incorporated by reference.

BACKGROUND

1. Field

The present disclosure relates generally to augmented reality and, more specifically, to remote multiparticipant augmented reality.

2. Description of the Related Art

Augmented reality has experienced rapid uptake in recent years. Examples include various types of games and image-modification applications on mobile phones, as well as the same implemented on head-mounted augmented reality displays. Often, augmented reality experiences draw upon various assets, such as three-dimensional models or two-dimensional models and associated textures to be inserted into the physical environment the user is viewing through the augmented reality display.

SUMMARY

The following is a non-exhaustive listing of some aspects of the present techniques. These and other aspects are described in the following disclosure.

Some aspects include a method including providing, by a computer system, participant state information for a participant controlled augmented reality object, controlled by a first augmented reality device located in a first physical environment, to at least one of a server or a second augmented reality device located in a second physical environment that is different than the first physical environment, wherein the first augmented reality device and the second augmented reality device are included in a remote multiparticipant augmented reality session; receiving, by the computer system, coparticipant state information for a coparticipant controlled augmented reality object associated with the second augmented reality device; generating, by the computer system, a shared virtual space; overlaying, by the computer system, the shared virtual space in the first physical environment viewed by the first augmented reality device; and populating, by the computer system, the shared virtual space with augmented reality objects, wherein at least a portion of the augmented reality objects includes the coparticipant controlled augmented reality object controlled by the second augmented reality device according to the coparticipant state information.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
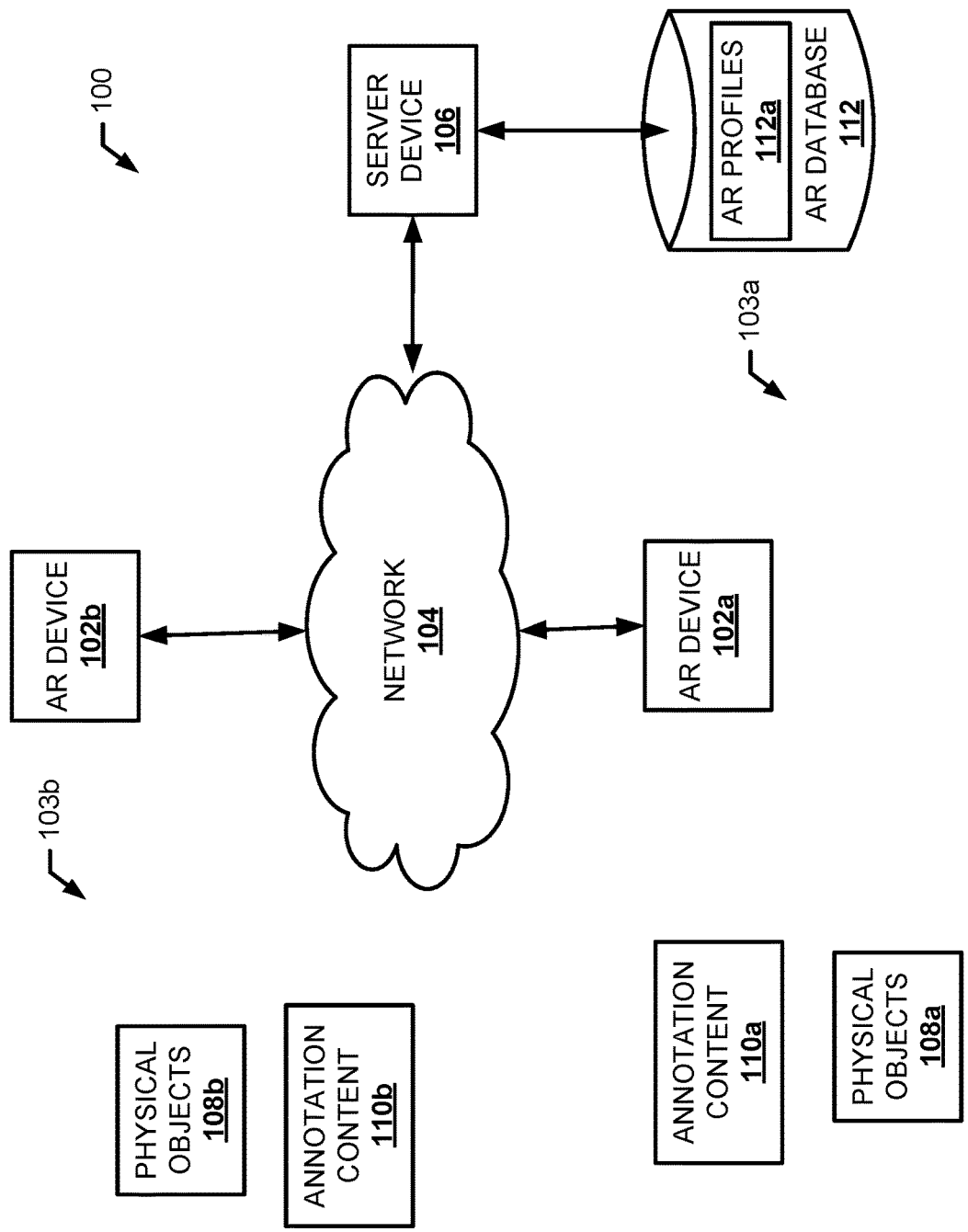
FIG. 1 is a schematic view illustrating an embodiment of a remote multiparticipant augmented reality system, in accordance with some embodiments of the present disclosure.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of augmented reality. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Augmented reality (AR) developer applications (e.g., ARCore or ARKit) are used to build augmented reality experiences for various operating systems and augmented reality devices. AR experiences may be built to play games, help physicians during surgery, assist in retail marketing and advertising during a shopping experience, augment objects in the real world with information about those objects, educational purposes, or other uses that would be apparent to one of skill in the art in possession of the present disclosure. In various augmented reality applications, multiple participants may interact with the real world in the same space to consume an AR experience with their AR devices. For example, AR objects, such as an AR character, may be positioned in the physical environment such that when a first AR participant is viewing the AR character from that first AR participant's position and AR device, that first AR participant will see the AR character from a first perspective (e.g., a front view). A second AR participant that is viewing the AR character from another position with a second AR device will visualize the AR character from a second perspective (e.g., a side view).

However, the inventors of the present disclosure recognized a need for remote multiparticipant AR. For example, two participants in different physical environments may want to interact and share their AR experiences such that augmented reality objects from both AR experiences are presented in each participant's AR display. In some examples, such as in games, the AR objects may include AR characters that are controlled independently by each AR participant and those AR characters may interact with each other in each physical environment such that a first participant viewing a first physical world with a first AR display and controlling a first AR object may also view a second AR object in the first physical world that is being controlled by a second participant viewing a second physical world at a different location with a second AR display. Likewise, the second participant may also view the first AR object that is being controlled by the first participant. However, remote multiparticipant AR presents numerous challenges and problems. For example, the physical environments of each participant are often very different. Therefore, challenges arise in providing a seamless user experience when AR objects are presented across physical environments. Furthermore, synchronizing AR objects from multiple AR experiences in both position and time provides challenges. For example, a table moved in the first AR environment should result in similar movement (both magnitude and direction) in either real-time or thereafter, in the second AR environment. In another example, a punch from a first AR character to a second AR character in one physical environment should result in a punch from the first AR character to the second AR character at the same location on the second AR character in the other physical environment at substantially the same time). These and other challenges and problems are addressed by the remote multiparticipant augmented reality system and methods discussed herein.

An embodiment of a remote multiparticipant augmented reality system 100 is illustrated in FIG. 1. In the illustrated embodiment, the remote multiparticipant augmented reality system 100 includes an augmented reality device 102*a* provided in a physical environment 103*a* and at least one other augmented reality device 102*b* provided in at least one other physical environment 103*b*. The physical environments 103*a* or 103*b* may be any indoor or outdoor space that may be contiguous or non-contiguous. For example, the physical environment 103*a* or 103*b* may include a yard, a park, a room, a stadium, a field, a mine site, a grocery store, a mall, an office in an office building, or other spaces. The physical environments 103*a* or 103*b* may be defined by geofencing techniques that may include specific geographic coordinates such as latitude, longitude, or altitude, or operate within a range defined by a wireless communication signal. The physical environments 103*a* or 103*b* may include one or more physical objects 108*a* or physical objects 108*b*, respectively (e.g., walls, tables, chairs, rocks, people, animals, exhibits, automobiles, or any other physical object that can be contemplated). Each physical environment 103*a* or 103*b* may be mapped with a respective virtual environment via an AR device localization process. The virtual environment may include augmented reality object 110*a* or 110*b* that is overlayed onto the real-world images of the respective physical environments 103*a* or 103*b* such that the augmented reality objects 110*a* or 110*b* appears in the display of the respective augmented reality device 102*a* or 102*b* viewing images of the physical world.

In various embodiments, the augmented reality devices 102*a* or 102*b* are described as a mobile computing device such as a laptop/notebook, a tablet, a mobile phone, and a wearable (e.g., glasses, a watch, a pendant). However, in other embodiments, the augmented reality devices 102*a* or 102*b* may be provided by desktop computers, servers, or a variety of other computing devices that would be apparent to one of skill in the art in possession of the present disclosure. The augmented reality devices 102*a* or 102*b* may include communication units having one or more transceivers to enable augmented reality devices 102*a* or 102*b* to communicate with field devices (e.g., IoT devices, beacons), other augmented reality devices, or a server device 106. As used herein, the phrase "in communication," including variances thereof, encompasses direct communication or indirect communication through one or more intermediary components and does not require direct physical (e.g., wired or wireless) communication or constant communication, but rather additionally includes selective communication at periodic or aperiodic intervals, as well as one-time events.

For example, the augmented reality devices 102*a* or 102*b* in the remote multiparticipant augmented reality system 100 of FIG. 1 may include first (e.g., relatively long-range) transceiver(s) to permit the augmented reality devices 102*a* or 102*b* to communicate with a network 104 via a communication channel. The network 104 may be implemented by an example mobile cellular network, such as a long-term evolution (LTE) network or other third generation (3G), fourth generation (4G) wireless network, or fifth generation (5G) wireless network. However, in some examples, the network 104 may be additionally or alternatively be implemented by one or more other communication networks, such as, but not limited to, a satellite communication network, a microwave radio network, or other communication networks.

The augmented reality devices 102*a* or 102*b* additionally may include second (e.g., relatively short-range) transceiver(s) to permit augmented reality devices 102*a* or 102*b* to communicate with IoT devices (e.g., beacons), other augmented reality devices, or other devices in the physical environments 103*a* or 103*b* via a different communication channel. In the illustrated example of FIG. 1, such second transceivers are implemented by a type of transceiver supporting short-range (i.e., operate at distances that are shorter than the long-range transceivers) wireless networking. For example, such second transceivers may be implemented by Wi-Fi transceivers (e.g., via a Wi-Fi Direct protocol), Bluetooth® transceivers, infrared (IR) transceiver, and other transceivers that are configured to allow the augmented reality devices 102*a* or 102*b* to intercommunicate via an ad-hoc or other wireless network.

The remote multiparticipant augmented reality system 100 also includes or may be in connection with a server device 106. For example, the server device 106 may include one or more servers, storage systems, cloud computing systems, or other computing devices (e.g., desktop computer(s), laptop/notebook computer(s), tablet computer(s), mobile phone(s), etc.). As discussed below, the server device 106 may be coupled to an augmented reality database 112 that is configured to provide repositories such as an augmented reality repository of augmented reality profiles 112a for various locations of interest within the physical environments 103a or 103b. For example, the augmented reality database 112 may include a plurality of augmented reality profiles 112a that each includes a location identifier (e.g., a target coordinate), annotation content, augmented reality objects, rendering instructions, object recognition data, mapping data, localization data, localization videos as well as any other information for providing an augmented reality experience to a display of the physical environments 103a or 103b. While not illustrated in FIG. 1, the augmented reality devices 102a or 102b may be coupled to one or more local augmented reality databases that may include at least a portion of the augmented reality profiles 112a (e.g., that may include an augmented reality model) stored in the augmented reality database 112.

Figure 2:
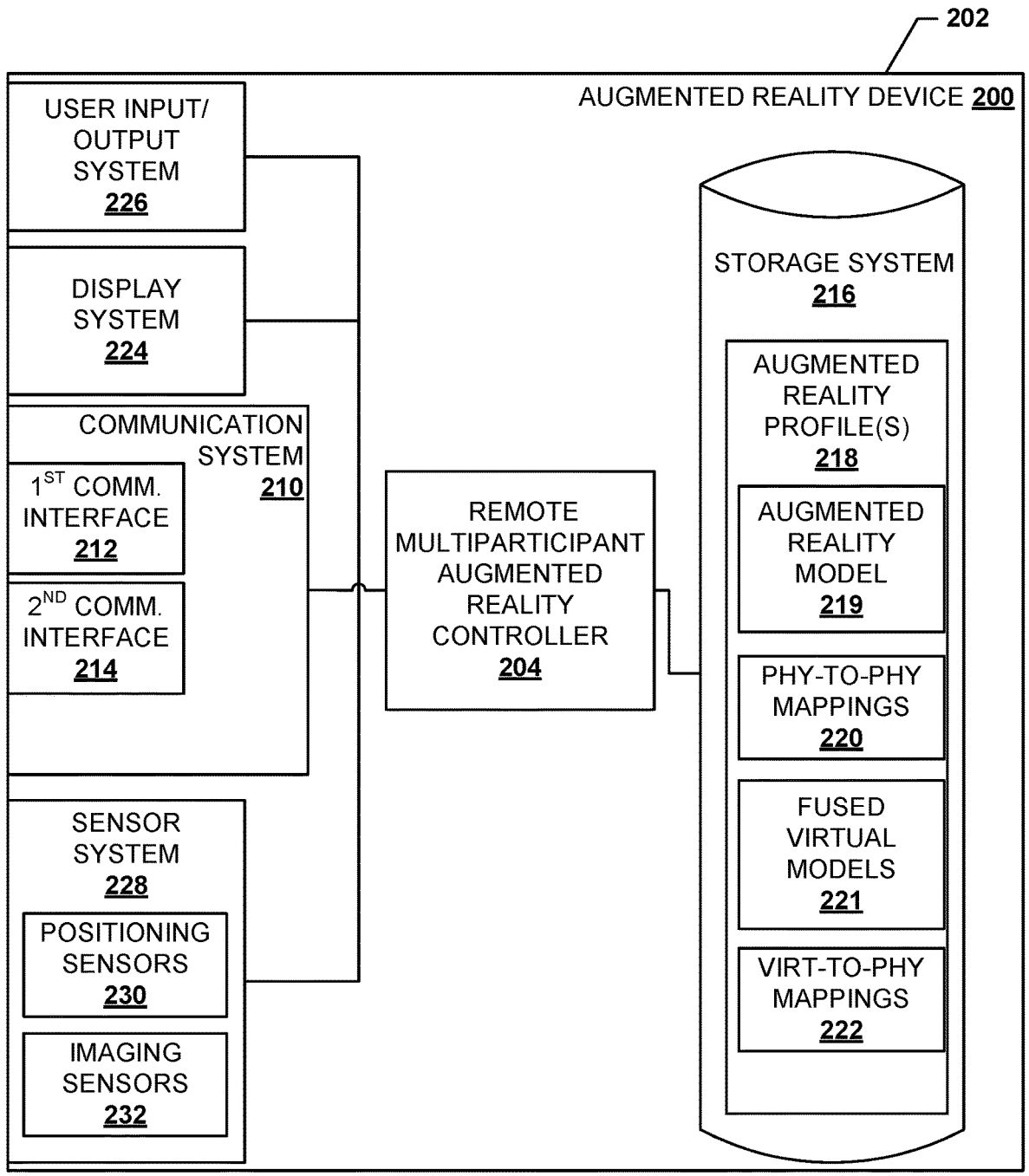
FIG. 2 is a schematic view illustrating an embodiment of an augmented reality device used in the remote multiparticipant augmented reality system of FIG. 1, in accordance with some embodiments of the present disclosure.

An embodiment of an augmented reality device 200 is illustrated in FIG. 2 that may be the augmented reality devices 102a or 102b discussed above with reference to FIG. 1, and which may be provided by a mobile computing device such as a laptop/notebook computer, a tablet computer, a mobile phone, a wearable computer or other computing device that may be apparent to one of skill in the art in possession of the present disclosure. In the illustrated embodiment, the augmented reality device 200 includes a chassis 202 that houses the components of the augmented reality device 200. Several of these components are illustrated in FIG. 2. For example, the chassis 202 may house a processing system (not illustrated) and a non-transitory memory system (not illustrated) that includes instructions that, when executed by the processing system, cause the processing system to provide a remote multiparticipant augmented reality controller 204 that is configured to perform the functions of the remote multiparticipant augmented reality controller or the augmented reality devices discussed below.

The chassis 202 may further house a communication system 210 that is coupled to the remote multiparticipant augmented reality controller 204 (e.g., via a coupling between the communication system 210 and the processing system). The communication system 210 may include software or instructions that are stored on a computer-readable medium and that allow the augmented reality device 200 to send and receive information through the communication networks discussed above. For example, the communication system 210 may include a communication interface 212 to provide for communications through the network 104 as detailed above (e.g., first (e.g., relatively long-range) transceiver(s)). In an embodiment, the communication interface 212 may be a wireless antenna that is configured to provide communications with IEEE 802.11 protocols (Wi-Fi), cellular communications, satellite communications, other microwave radio communications or communications. The communication system 210 may also include a communication interface 214 that is configured to provide direct communication with other user devices, sensors, storage devices, and other devices within the physical environments 103a or 103b discussed above with respect to FIG. 1. (e.g., second (e.g., relatively short-range) transceiver(s)). For example, the communication interface 214 may be configured to operate according to wireless protocols such as Bluetooth®, Bluetooth® Low Energy (BLE), near field communication (NFC), infrared data association (IrDA), ANT®, Zigbee®, Z-Wave® IEEE 802.11 protocols (Wi-Fi), and other wireless communication protocols that allow for direct communication between devices.

The chassis 202 may house a storage device (not illustrated) that provides a storage system 216 that is coupled to the remote multiparticipant augmented reality controller 204 through the processing system. The storage system 216 may be configured to store augmented reality profiles 218 in one or more augmented reality repositories. Each augmented reality profile 218 may include an augmented reality model 219, one or more physical-to-physical environment mappings 220, one or more shared virtual spaces 221, or one or more virtual-to-physical environment mappings 222. For example, the virtual-to-physical environment mapping 222 may map the augmented reality model 219 to the physical environment 103a or 103b and may be used to localize the augmented reality device 200 to a virtual camera pose. The augmented reality model 219 may include a two-dimensional image/model, a three-dimensional image/model, annotation content, text, an audio file, a video file, a link to a website, an interactive annotation, or any other visual or auditory annotations that may be superimposed on or near a location of interest or a reference point such that the augmented reality model 219 is associated with in the physical environment 103a or 103b being reproduced on a display screen included on a display system 224 of the augmented reality device 200. The augmented reality model 219 may also include rendering instructions that provide instructions to the augmented reality device 200 as to how the augmented reality device 200 is to display the augmented reality model 219 via the display system 224. The one or more physical-to-physical environment mappings 220 may map a physical environment associated with the augmented reality device 200 to another participant's physical environment (e.g., a mapping of the physical environment 103a to the physical environment 103b). This may be accomplished by shared virtual spaces generated from physical environment information gathered and distributed by each augmented reality from its associated physical environment. Some embodiments of the shared virtual spaces 221 may include fusing virtual models of the physical environments 103a and 103b that are stored as the fused virtual models and then mapping or aligning the physical environment 103a or 103b in the augmented reality device's camera view to the fused virtual model. In addition, the storage system 216 may include at least one application that provides instruction to the remote multiparticipant augmented reality controller 204 when providing the augmented reality model 219 on a display system 224.

In various embodiments, the chassis 202 also houses a user input/output (I/O) system 226 that is coupled to the remote multiparticipant augmented reality controller 204 (e.g., via a coupling between the processing system and the user I/O system 226). In an embodiment, the user I/O system 226 may be provided by a keyboard input subsystem, a mouse input subsystem, a track pad input subsystem, a touch input display subsystem, a microphone, an audio system, a haptic feedback system, or any other input/output subsystem that would be apparent to one of skill in the art in possession of the present disclosure. The chassis 202 also houses the display system 224 that is coupled to the remote multiparticipant augmented reality controller 204 (e.g., via a coupling between the processing system and the display system 224) and may be included in the user I/O system 226. In some embodiments, the display system 224 may be provided by a display device that is integrated into the augmented reality device 200 and that includes a display screen (e.g., a display screen on a laptop/notebook computing device, a tablet computing device, a mobile phone, AR glasses, or other wearable devices/AR devices), or by a display device that is coupled directly to the augmented reality device 200 (e.g., a display device coupled to a desktop computing device by a cabled or wireless connection).

The chassis 202 may also house a sensor system 228 that may be housed in the chassis 202 or provided on the chassis 202. The sensor system 228 may be coupled to the remote multiparticipant augmented reality controller 204 via the processing system. The sensor system 228 may include one or more sensors that gather sensor data about the augmented reality device 200, a user of the augmented reality device 200, the physical environment 103a or 103b around the augmented reality device 200 or other sensor data that may be apparent to one of skill in the art in possession of the present disclosure. For example, the sensor system 228 may include positioning sensors 230 that may include a geolocation sensor (a global positioning system (GPS) receiver, a real-time kinematic (RTK) GPS receiver, or a differential GPS receiver), a Wi-Fi based positioning system (WPS) receiver, an accelerometer, a gyroscope, a compass, an inertial measurement unit (e.g., a six axis IMU), or any other sensor for detecting or calculating orientation, location, or movement that would be apparent to one of skill in the art in possession of the present disclosure. The sensor system 228 may include an imaging sensor 232 that may include an imaging sensor such as a camera, a depth sensing camera (for example based upon projected structured light, time-of-flight, a lidar sensor, or other approaches), other imaging sensors (e.g., a three-dimensional image capturing camera, an infrared image capturing camera, an ultraviolet image capturing camera, similar video recorders, or a variety of other image or data capturing devices that may be used to gather visual information from the physical environment 103a or 103b surrounding the augmented reality device 200). The sensor system 228 may include other sensors such as, for example, a beacon sensor, ultra-wideband sensors, a barometric pressure sensor, one or more biometric sensor, an actuator, a pressure sensor, a temperature sensor, an RFID reader/writer, an audio sensor, an anemometer, a chemical sensor (e.g., a carbon monoxide sensor), or any other sensor that would be apparent to one of skill in the art in possession of the present disclosure. While a specific augmented reality device 200 has been illustrated, one of skill in the art in possession of the present disclosure will recognize that augmented reality devices (or other devices operating according to the teachings of the present disclosure in a manner similar to that described below for the augmented reality device 200) may include a variety of components and/or component configurations for providing conventional computing device functionality, as well as the functionality discussed below, while remaining within the scope of the present disclosure as well.

Figure 3:
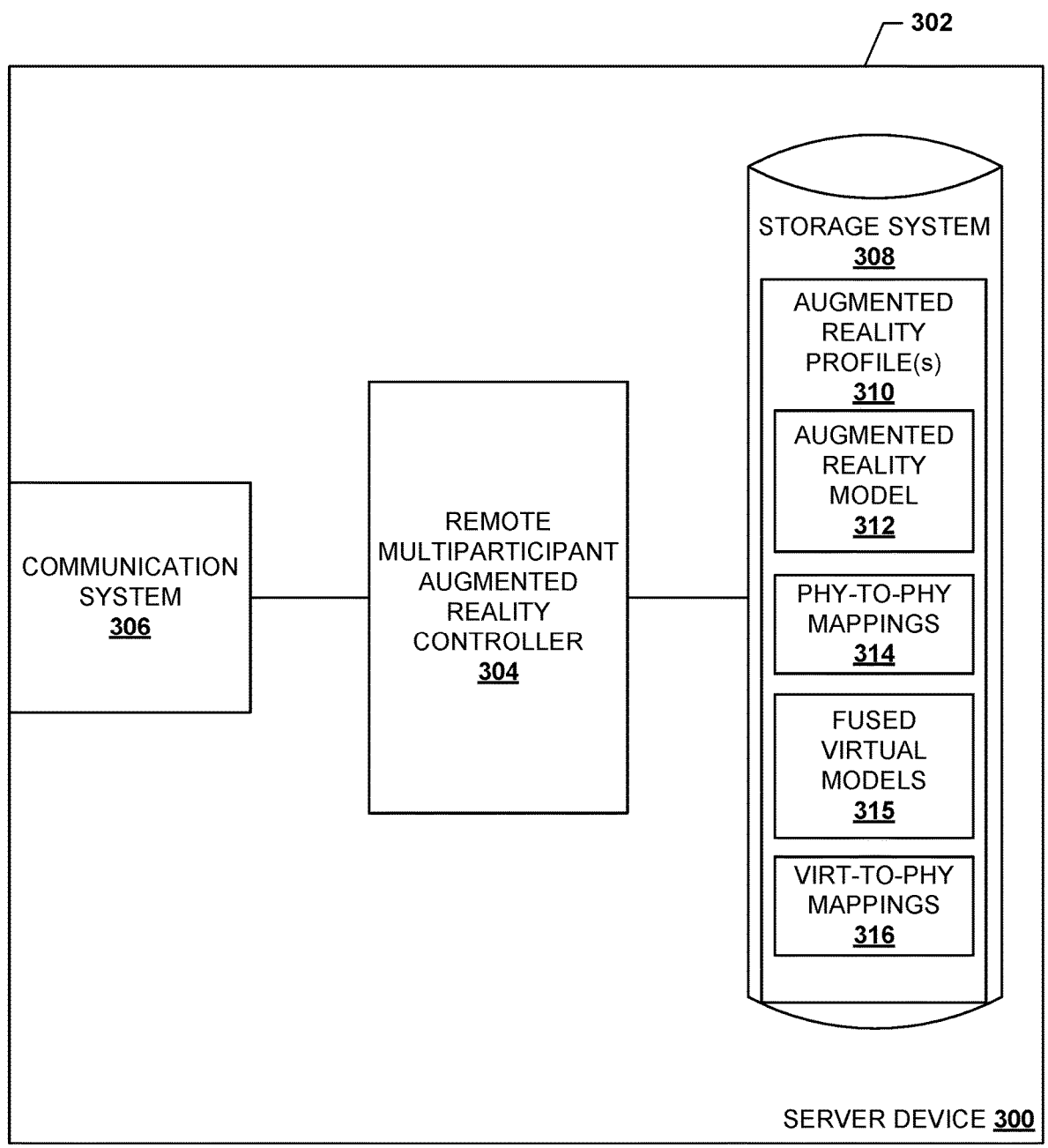
FIG. 3 is a schematic view illustrating an embodiment of a server device used in the remote multiparticipant augmented reality system of FIG. 1, in accordance with some embodiments of the present disclosure.

An embodiment of a server device 300 is illustrated in FIG. 3 that may be the server device 106 discussed above with reference to FIG. 1. As such, the server device 300 may include a server or a plurality of servers or computers that distribute operations across the plurality of servers. In the illustrated embodiment, the server device 300 includes a chassis 302 that houses the components of the server device 300, only some of which are illustrated in FIG. 3. For example, the chassis 302 may house a processing system (not illustrated) and a non-transitory memory system (not illustrated) that includes instructions that, when executed by the processing system, cause the processing system to provide a remote multiparticipant augmented reality controller 304 that is configured to perform the functions of the remote multiparticipant augmented reality controller or servers discussed below. In the specific example illustrated in FIG. 3, the remote multiparticipant augmented reality controller 304 may be configured to perform at least a portion of the augmented reality functionality described herein such that resources on the augmented reality devices 102a or 102b may be freed to perform other functionality.

The chassis 302 may further house a communication system 306 that is coupled to the remote multiparticipant augmented reality controller 304 (e.g., via a coupling between the communication system 306 and the processing system) and that is configured to provide for communication through the network 104 as detailed below. The communication system 306 may allow the server device 300 to send and receive information over the network 104 of FIG. 1. For example, the communication system 306 may include one or more network interface controllers (NIC), a converged network adapter (CAN), a host bus adapter (HBA), or other network/storage communication interface that would be apparent to one of skill in the art in possession of the present disclosure. The chassis 302 may also house a storage device (not illustrated) that provides a storage system 308 that is coupled to the remote multiparticipant augmented reality controller 304 through the processing system. The storage system 308 may be included in the augmented reality database 112 of FIG. 1. The storage system 308 may be configured to store augmented reality profiles 310 in one or more augmented reality repositories (e.g., such as the augmented reality profiles 112a). The storage system 308 may be configured to store augmented reality profiles 310 in one or more augmented reality repositories. Each augmented reality profile 310 may include an augmented reality model 312, one or more physical-to-physical environment mappings 314, one or more fused virtual models 315, or one or more virtual-to-physical environment mappings 316. For example, the virtual-to-physical environment mapping 316 may map the augmented reality model 312, fused virtual models 315, or a virtual model to the physical environment 103a or 103b and may be used to localize the augmented reality device 102a or 102b to the augmented reality model 312. The augmented reality model 312 may include a two-dimensional image/model, a three-dimensional image/model, annotation content, text, an audio file, a video file, a link to a website, an interactive annotation, or any other visual or auditory annotations that may be superimposed on or near a location of interest or a reference point such that the augmented reality model 312 is associated with in the physical environment 103a or 103b being reproduced on a display screen included on a display system 224 of the augmented reality devices 102a or 102b. The augmented reality model 312 may also include rendering instructions that provide instructions to the augmented reality device 102a or 102b as to how the augmented reality device 102a or 102b is to display the augmented reality model 312 via the display system 224. The one or more physical-to-physical environment mappings 314 may map a physical environment associated with an augmented reality device to another participant's physical environment (e.g., a mapping of the physical environment 103a to the physical environment 103b). In addition, the storage system 308 may include at least one application that provides instruction to the remote multiparticipant augmented reality controller 304 when providing the augmented reality model 312 on a display system 224 of the augmented reality device 200 of FIG. 2.

While the augmented reality profile(s) 310 on the server device 300 is shown separate from the augmented reality profile(s) 218 on the augmented reality device 200, the augmented reality profile(s) 310 and 218 may be the same, a portion of the augmented reality profile(s) 310 and 218 on each storage system 216 and 308 may be the same (e.g., a portion of the augmented reality profile(s) 310 are cached on the augmented reality device 200 storage system 216), or the augmented reality profile(s) 310 and 218 may be different. In some embodiments, if the augmented reality profile(s) 310 and 218 are the same, the information of a particular augmented reality profile may be distributed between the server device 300 and the augmented reality device 200 such that a portion of any of the information included in the augmented reality profile (the augmented reality model 219/312, the physical-to-physical environment mapping 220/314, the shared virtual space 221/315, or the virtual-to-physical environment mapping 222/316) is stored on the storage system 308 while another portion is stored on the storage system 216. While a specific server device 300 has been illustrated, one of skill in the art in possession of the present disclosure will recognize that server devices (or other devices operating according to the teachings of the present disclosure in a manner similar to that described below for the server device 300) may include a variety of components and/or component configurations for providing conventional computing device functionality, as well as the functionality discussed below, while remaining within the scope of the present disclosure as well.

Figure 4:
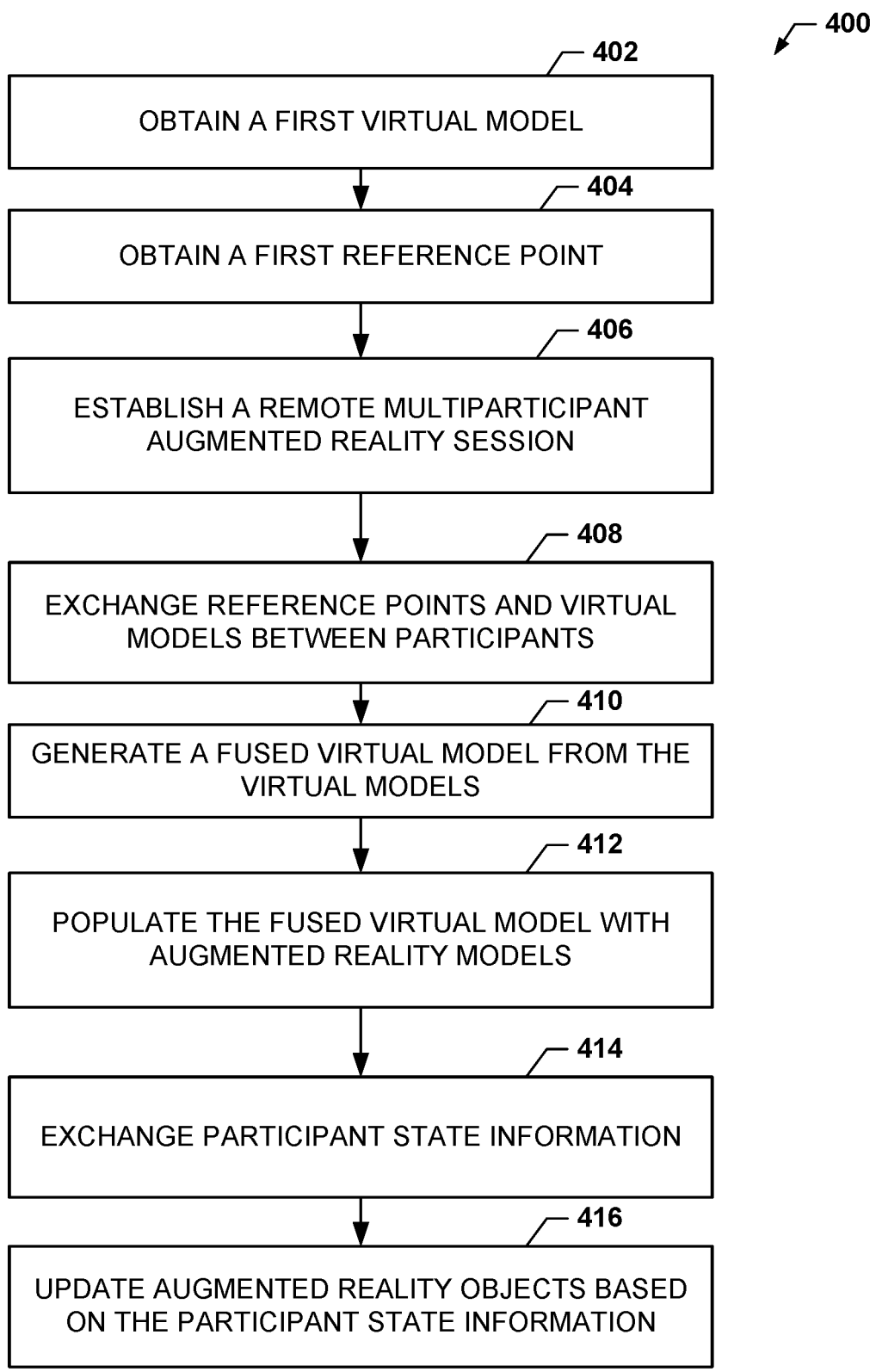
FIG. 4 is a flow chart illustrating an embodiment of a method of remote multiparticipant augmented reality, in accordance with some embodiments of the present disclosure.

FIG. 4 depicts an embodiment of a method 400 of remote multiparticipant augmented reality, which in some embodiments may be implemented with the components of FIGS. 1, 2, and 3 discussed above. As discussed below, some embodiments make technological improvements to augmented reality, remote multiparticipant augmented reality, and other technology areas. The method 400 is described as being performed by the remote multiparticipant augmented reality controller 204 on the augmented reality device 102a, 102b or 200. Furthermore, it is contemplated that the remote multiparticipant augmented reality controller 304 on the server device 106/300 may include some or all the functionality of the remote multiparticipant augmented reality controller 204. As such, some or all of the steps of the method 400 may be performed by the server device 106/300 and still fall under the scope of the present disclosure. As mentioned above, the server device 106/300 may include one or more processors or one or more servers, and thus the method 400 may be distributed across the those one or more processors or the one or more servers.

The method 400 may begin at block 402 where first physical environment information of a first physical environment associated with a first augmented reality device in a remote multiparticipant augmented reality session is obtained. In various embodiment, at block 402, the remote multiparticipant augmented reality controller 204 may obtain physical environment information associated with the physical environment in which is being viewed on an associated augmented reality display (e.g., display system 224). The physical environment information may include any understanding of the physical environment such as plane vectors, cloud points or the like. In some embodiments, the physical environment information may include a virtual model of the physical environment. In an embodiment, at block 402, the remote multiparticipant augmented reality controller 204 may obtain a virtual model of a physical environment. For example, the augmented reality device 102a may obtain a virtual model (e.g., a spatial mapping) of the physical environment 103a. The virtual model may be a stored virtual model created by the remote multiparticipant augmented reality controller 204 at a previous time or by another computing device with a virtual model mapping application (e.g., a robotic device that maps rooms, a smart phone with a virtual model mapping application). As such, the virtual model may be stored in and obtained from the storage system 216 or 308. However, in other embodiments, the remote multiparticipant augmented reality controller 204 may generate a new virtual model and store the virtual model. In some embodiments, the virtual model may be stored with position information such as a geolocation, indoor location information, orientation information, or other information associated with the virtual model (e.g., time, date, material type of scanned objects, or device information used to capture) that would be apparent to one of skill in the art in possession of the present disclosure. The virtual model may include a plurality of object planes in the physical environment, a mesh construct of the objects, or other spatial mapping constructs that would be apparent to one of skill in the art in possession of the present disclosure.

In some embodiments, the physical environment information obtained such as a virtual model may be mapped to the physical environment that is being viewed on the display device of the display system 224 of the augmented reality device 200 to create the virtual-to-physical environment mappings 222. For example, the augmented reality device 200 may scan the physical environment for feature points for localization where the feature points map the physical environment to the virtual environment (e.g., a virtual camera pose to a physical camera pose of the augmented reality device 200). When the feature points are detected and using the positioning information of the augmented reality device 200, the remote multiparticipant augmented reality controller 204 may align a virtual camera pose of the virtual model to the physical camera pose of the imaging sensor 232 that captures the physical environment and presents that physical environment through the display of the display system 224. As such, the alignment of the virtual camera pose to the physical camera pose may localize the augmented reality device and map the virtual model to the physical environment that the user is currently viewing.

In some embodiments, the physical environment information associated with the physical environment associated with the augmented reality device 200 may include a reference point that is obtained from the physical environment. In an embodiment, the remote multiparticipant augmented reality controller 204 may obtain a reference point. The reference point may include a user selected coordinate in the physical environment that may be mapped to the virtual model (e.g., a virtual environment) such that the reference point is mapped between the physical and virtual environments. In some embodiments, the remote multiparticipant augmented reality controller 204 may automatically select a reference point by determining an optimal reference point for the physical environment in which the augmented reality device 200 is operating. In various embodiments, the reference point may be determined by the remote multiparticipant augmented reality controller 304 on the server device 106/300. For example, an external cloud function, given a room scan or matchmaking server once players are matched the lobby, is created and a point is selected. In various embodiments, a combination of the augmented reality device 200 and the server device 300 may determine a reference point for the physical environment. While certain embodiments of physical environment information associated with a physical environment are described above, other information that can be used with another augmented reality device's physical environment information to create a share virtual space is contemplated.

The method 400 may proceed to block 404 where a remote multiparticipant augmented reality session is established. In an embodiment, at block 404, the remote multiparticipant augmented reality controller 204 may establish a remote multiparticipant augmented reality session with another augmented reality device. For example, the augmented reality device 102a may establish a remote multiparticipant augmented reality session with the augmented reality device 102b. In some embodiments, the remote multiparticipant augmented reality controller 204 may select the participant(s) that the augmented reality device 200 is going to establish the remote multiparticipant augmented reality session with. For example, the remote multiparticipant augmented reality controller 204 may match augmented reality devices based on those augmented reality devices satisfying session conditions. The session conditions may be based on device capabilities, network capabilities, physical environments having a threshold of similarity, or other session criteria that would be apparent to one of skill in the art in possession of the present disclosure. In other embodiments, the selection of participants may be based on participant identifiers presented by the one or more participants where users of the augmented reality devices invite each other to the remote multiparticipant augmented reality session.

The establishment of the remote multiparticipant augmented reality session may include the participants establishing peer-to-peer connections between the augment reality devices 200 (e.g., a peer-to-peer connection between the augmented reality device 102a and the augmented reality device 102b). As such, the augmented reality device 102a may generate and send the peer-to-peer connection initiation signal to the augmented reality device 102b. For example, the remote multiparticipant augmented reality controller 204 may communicate with a real-time communication (RTC) application programming interface (API) such as, for example, a WebRTC API. The WebRTC protocol may include the interactive connectivity establishment (ICE) protocol for establishing a peer-to-peer connection. As such, the peer-to-peer initiation signal may include a session description protocol (SDP) offer according to the SDP protocol. In various embodiments, the peer-to-peer initiation signal is provided via the network 104 and the server device 106 that may include relay server capabilities. For example, the peer-to-peer initiation signal is provided through a persistent connection (e.g., a websocket) established between the augmented reality device 102b and the server device 106 and a persistent connection established between the augmented reality device 102b and the server device 106. The augmented reality device 102b may then receive the peer-to-peer initiation signal. The augmented reality device 102b may process the peer-to-peer connection initiation signal and respond via the server device 106 with a peer-to-peer connection response signal to the augmented reality device 102a. In various embodiments, the peer-to-peer connection response signal may include an SDP answer or any other response signal that would be apparent to one of skill in the art in possession of the present disclosure. The augmented reality device 102b may receive the peer-to-peer connection response signal and process the response signal to establish a peer-to-peer connection (e.g., a real-time connection using WebRTC). As such, the peer-to-peer connection may be able to communicate one or more media streams (e.g., a video stream, an audio stream, an audiovisual stream or other media content stream) between the augmented reality device 102a and the augmented reality device 102b.

While the remote multiparticipant augmented reality session is described as being established via a peer-to-peer connection, the remote multiparticipant augmented reality session may be established via a selective forwarding unit (SFU) architecture, a multipoint conference unit (MCU) architecture, an experience delivery network (XDN) architecture, or any other architecture that would be apparent to one of skill in the art in possession of the present disclosure.

The method 400 may proceed to block 406 where physical environment information associated with the physical environments associated with respective augmented reality devices are exchanged between the participants. In an embodiment, at block 408, the remote multiparticipant augmented reality controller 204 may send, for example, via the peer-to-peer connection or other remote multiparticipant augmented reality session connection the physical environment information obtained at block 402. As such, the physical environment information may include the reference point or the virtual model of the physical environment to the other participant's augmented reality device that is participating in the remote multiparticipant augmented reality session. Also, the remote multiparticipant augmented reality controller 204 may receive via, for example, the peer-to-peer connection) the physical environment information of the physical environment from the other participant's augmented reality device. For example, augmented reality device 102a may send the reference point and the virtual model to the augmented reality device 102b. Similarly, the augmented reality device 102a may receive the reference point and the virtual model associated with the augmented reality device 102b or any other augmented reality devices that are participating in the remote multiparticipant augmented reality session. The virtual models may be described in planes. The planes themselves may be described in vector form such that each plane is defined by a point and a normal vector. By vectorizing the planes, less data intensive packets of information may be sent via the session connection which improves latency during the remote multiparticipant augmented reality session.

The method 400 may proceed to block 408 where the physical environment information associated with the physical environments are processed to generate a shared virtual space. In an embodiment, at block 408, the remote multiparticipant augmented reality controller 204 may process the received physical environment information from the other participating augmented reality device with its own obtained physical environment information. For example, the remote multiparticipant augmented reality controller 204 may simply match and align the ground planes of both virtual models and the fused virtual models may include the aligned ground planes. In other embodiments, the reference points may be aligned and orientated using position information obtained from positioning sensors 230. In other embodiments, the remote multiparticipant augmented reality controller 204 may select features from the first physical environment information and features from the second physical environment information and use those selected features to generate the shared physical space. As such, in some embodiments, the shared physical space generated may deviate between the first augmented realty device and the second augmented reality device.

In yet other embodiments, to improve the experience, planes of other objects in the virtual models may be incorporated into the shared virtual space. For example, walls and other objects of the physical environments 103a or 103b represented in the virtual models may be incorporated into the shared virtual space. Those objects may provide constraints to augmented reality models inserted into the remote multiparticipant augmented reality session. In some embodiments, the shared virtual space may be constrained to the smallest dimensions of the combined virtual spaces so that when a remote multiparticipant augmented reality session is occurring with users augmented reality objects, those objects do not extend through physical walls as viewed by a user but stay within the viewable physical environment. As such, one user may see an AR avatar restrained by a virtual wall that represents the other user's physical wall, while the other user views the AR avatar being restrained by their physical wall.

In some embodiments, the objects inserted into the shared virtual space and that are from the physical environment information received may be paired with augmented reality models such that augmented reality models may augment the physical environment that is being viewed by the participant. Otherwise, those objects may appear as "ghosts" or invisible to the participant but still act as barriers or constraints to other augmented reality objects in the augmented reality scene. For example, a physical couch in one participant's view and represented by that user's physical environment information may be represented by an AR couch in the other user's physical view via the share virtual space. In some embodiments, the remote multiparticipant augmented reality controller 204 may selectively choose which objects to incorporate or not incorporate into the shared virtual space. For example, objects that have a low profile such that they satisfy a low-profile condition may not be included in the shared virtual space while objects that have a high-profile (e.g., satisfy a size requirement) are included in the shared virtual space. As a result of the generation of the shared virtual space that may include the fusion of the virtual models, the augmented reality devices that are included in the remote multiparticipant augmented reality session may provide experiences of at least a portion of the constraints experienced by the other participant(s) in the remote multiparticipant augmented reality session.

The method 400 may proceed to block 410 where augmented reality objects populate the shared virtual space. In an embodiment, at block 410, remote multiparticipant augmented reality controller 204 may augment the shared virtual spaces such as a fused virtual model with augmented reality objects. The augmented reality objects may include various permissions or categories. For example, the augmented reality objects may include participant controlled augmented reality objects that include augmented reality objects that are controlled by the user of the local augmented reality device. The augmented reality objects may include coparticipant controlled augmented reality objects that include augmented reality objects that are controlled by other participants of the remote multiparticipant augmented reality session. The augmented reality objects may include permissionless augmented reality objects that may be controlled by a set or all of the participants of the remote multiparticipant augmented reality session. However, those objects may become under the control of one of the participants under certain circumstances. For example, a participant controlled augmented reality object such as an avatar may pick up a permissionless augmented reality object (e.g., a virtual weapon, item, or the like), then that permissionless augmented reality object becomes a participant controlled augmented reality object associated with the participant that gained control of the augmented reality object via that participant's avatar. In some embodiments, the augmented reality objects may also include application controlled augmented reality objects that may include augmented reality objects that are controlled by the augmented reality application. For example, an application-controlled character may be injected into the shared virtual space and that application-controlled character/augmented reality object may not be controlled by any of the participants. The augmented reality objects may include other stationary augmented reality objects such as application-oriented augmented reality objects or other augmented reality objects and permissions that would be apparent to one of skill in the art in possession of the present disclosure. In various embodiments, the augmented reality objects may be oriented in the shared virtual space in relation to the reference points.

The method 400 may proceed to block 412 where participant state information is exchanged between the participants. In various embodiments, at block 412, the remote multiparticipant augmented reality controller 204 may be operating the remote multiparticipant augmented reality session where participants control their augmented reality objects. For example, augmented reality objects that are participant controlled augmented reality objects may include participant state information. Participant state information for those augmented reality objects may be exchanged between the participants. For example, the augmented reality device 102a may receive participant state information from the augmented reality device 102b and provide its participant state information to the augmented reality device 102b. The participant state information may include participant position information that includes a current position (e.g., a two-dimensional coordinate, a three-dimensional coordinate, or any other information to describe a current position of the participant) in the coordinate grid environment or shared virtual space of that participant, a user input position of that participant (e.g., a coordinate in virtual that the user input from decision block 402 that instructs the participant to move to), or a time of the user input for that participant-controlled augmented reality object, but may also include other state information for determining truth in the coordinate grid environment/shared virtual space. In additional examples, the participant state information may include participant health, abilities, virtual items associated with the participant, speed, appearance, or other attributes/states that may be updateable.

The method 400 may proceed to block 414 where the participant state information received from the coparticipant causes an update to the augmented reality object associated with the coparticipant. In an embodiment, at block 414, the remote multiparticipant augmented reality controller 204 may update the participant state information for the coparticipant controlled augmented reality object that is being viewed in a display of the display system 224. As a result, the coparticipant's augmented reality model may be updated with the received state information causing that augmented reality object's state to change, which may include visual state change (e.g., such as movement, health, appearance, or the like) of the coparticipant's augmented reality object viewed in the display of the display system 224 of the augmented reality device 200.

In some embodiments, a user may move a physical object in the physical environment or otherwise change a state of the physical object in the physical environment and that movement or state change in the physical environment may cause the virtual model associated with the participant to change and thus, change the shared virtual space. Changing the virtual model mapped to the physical environment may cause, via a communication of the physical object state change to the coparticipant's augmented reality device, a change in the shared virtual space and any augmented reality objects that are associated with the shared virtual space. For example, a user of the augmented reality device 102a may move a physical box from one set of coordinates to another set of coordinates in the physical environment 103a. As a result, the shared virtual space that is mapped to the physical environment 103b where the augmented reality device 102b is located may change the location of the virtual box in the shared virtual space such that it is moved from the first set of coordinates to the second set of coordinates. If there is an augmented reality object associated with the virtual box, that augmented reality object may move from the first set of coordinates to the second set of coordinates as presented to the user of the augmented reality device 102b via the display of the display system 224.

Thus, systems and methods of the present disclosure provide remote multiparticipant augmented reality sessions where users of augmented reality devices in different physical environments may share an augmented reality experience. Augmented reality devices participating in a remote multiparticipant augmented reality session exchange physical environment information such as reference points and virtual models of their respective physical environments that are being captured by a camera of those augmented reality devices. The augmented reality devices or a server computing device may align the physical environment information into a shared virtual space such as a fused virtual model. The shared virtual space may be populated with augmented reality objects such that each augmented reality device can view the augmented reality objects remote from each other in different physical environments and in real-time. At least one of the augmented reality objects viewed by an augmented reality device may be controlled by a participant of another augmented reality device participating in the remote multiparticipant augmented reality session. As such, embodiments of the present disclosure make improvements to augmented reality systems by allowing participants to interact with each other but with different physical environments and provide for efficient network communication such that the remote participants experience the augmented reality interactions in real-time.

Figure 5:
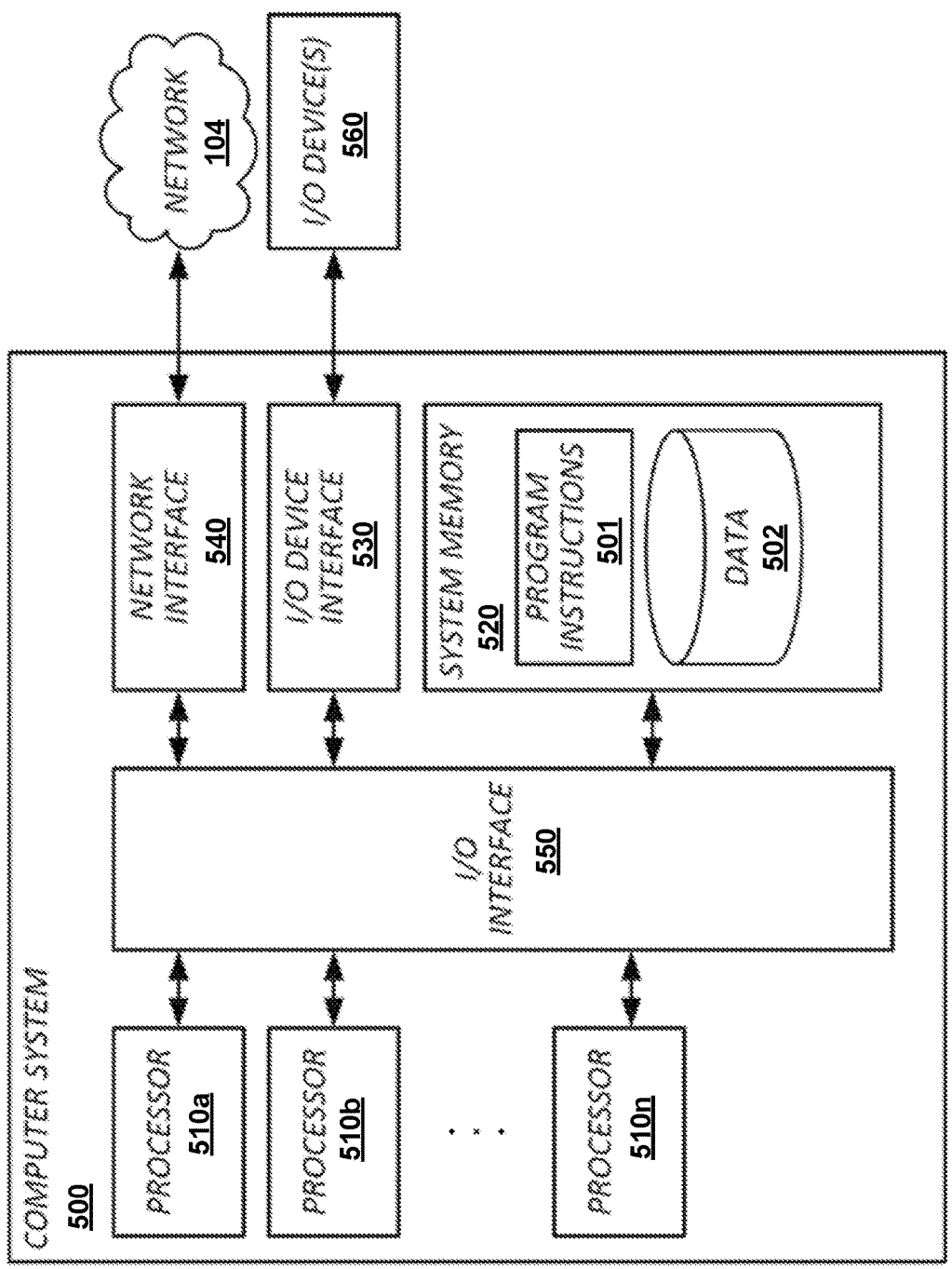
FIG. 5 is a block diagram of an example of a computing system with which the present techniques may be implemented, in accordance with some embodiments of the present disclosure.

FIG. 5 is a diagram that illustrates an exemplary computing system 500 in accordance with embodiments of the present technique. The augmented reality devices 102a, 102b, and 200 and the server devices 106 and 300, discussed above, may be provided by the computing system 500. Various portions of systems and methods described herein, may include or be executed on one or more computing systems similar to computing system 500. Further, processes and modules described herein may be executed by one or more processing systems similar to that of computing system 500.

Computing system 500 may include one or more processors (e.g., processors 510a-510n) coupled to system memory 520, an input/output I/O device interface 530, and a network interface 540 via an input/output (I/O) interface 550. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 500. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 520). Computing system 500 may be a uni-processor system including one processor (e.g., processor 510a), or a multi-processor system including any number of suitable processors (e.g., 510a-510n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 500 may include a plurality of computing devices (e.g., distributed computing systems) to implement various processing functions.

I/O device interface 530 may provide an interface for connection of one or more I/O devices 560 to computing system 500. I/O devices may include devices that receive input (e.g., from a user) or output information (e.g., to a user). I/O devices 560 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 560 may be connected to computing system 500 through a wired or wireless connection. I/O devices 560 may be connected to computing system 500 from a remote location. I/O devices 560 located on remote computing system, for example, may be connected to computing system 500 via a network and network interface 540.

Network interface 540 may include a network adapter that provides for connection of computing system 500 to a network. Network interface 540 may facilitate data exchange between computing system 500 and other devices connected to the network. Network interface 540 may support wired or wireless communication. The network may include an electronic communication network, such as the Internet, a local area network (LAN), a wide area network (WAN), a cellular communications network, or the like.

System memory 520 may be configured to store program instructions 501 or data 502. Program instructions 501 may be executable by a processor (e.g., one or more of processors 510a-510n) to implement one or more embodiments of the present techniques. Instructions 501 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 520 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM or DVD-ROM, hard-drives), or the like. System memory 520 may include a non-transitory computer readable storage medium that may have program instructions stored thereon that are executable by a computer processor (e.g., one or more of processors 510a-510n) to cause the subject matter and the functional operations described herein. A memory (e.g., system memory 520) may include a single memory device or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 550 may be configured to coordinate I/O traffic between processors 510a-1010n, system memory 520, network interface 540, I/O devices 560, or other peripheral devices. I/O interface 550 may perform protocol, timing, or other data transformations to convert data signals from one component (e.g., system memory 520) into a format suitable for use by another component (e.g., processors 510a-510n). I/O interface 550 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 500 or multiple computing systems 500 configured to host different portions or instances of embodiments. Multiple computing systems 500 may provide for parallel or sequential processing/execution of one or more portions of the techniques described herein.

Those skilled in the art will appreciate that computing system 500 is merely illustrative and is not intended to limit the scope of the techniques described herein. Computing system 500 may include any combination of devices or software that may perform or otherwise provide for the performance of the techniques described herein. For example, computing system 500 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 500 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 500 may be transmitted to computing system 500 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computing system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computing system" performing step A and "the computing system" performing step B can include the same computing device within the computing system performing both steps or different computing devices within the computing system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A non-transitory, machine-readable medium storing instructions that, when executed by one or more processors, effectuate operations comprising: providing, by a computer system, participant state information for a participant controlled augmented reality object, controlled by a first augmented reality device located in a first physical environment, to at least one of a server or a second augmented reality device located in a second physical environment that is different than the first physical environment, wherein the first augmented reality device and the second augmented reality device are included in a remote multiparticipant augmented reality session; receiving, by the computer system, coparticipant state information for a coparticipant controlled augmented reality object associated with the second augmented reality device; generating, by the computer system, a shared virtual space; overlaying, by the computer system, the shared virtual space in the first physical environment viewed by the first augmented reality device; and populating, by the computer system, the shared virtual space with augmented reality objects, wherein at least a portion of the augmented reality objects includes the coparticipant controlled augmented reality object controlled by the second augmented reality device according to the coparticipant state information.
2. The embodiment of claim 1, wherein the operations further comprise: providing, by the computer system, first physical environment information associated with the first augmented reality device to at least one of the server or the second augmented reality device that is included in the second physical environment; receiving, by the computer system, second physical environment information associated with the second physical environment from the second augmented reality device included in the remote multiparticipant augmented reality session; generating, by the computer system and using the first physical environment information and the second physical environment information, the shared virtual space having constraints gathered from both the first physical environment information and the second physical environment information.
3. The medium of embodiment 2, wherein the operations further include: obtaining, by the computer system, the first physical environment information of the first physical environment for the remote multiparticipant augmented reality session that includes the first augmented reality device and the second augmented reality device.
4. The medium of embodiment 2, wherein the first physical environment information includes a first reference point selected within the first physical environment and the second physical environment information includes a second reference point selected within the second physical environment.
5. The medium of embodiment 4, wherein the operations further include:
   obtaining, by the computer system, the first reference point selected within the first physical environment captured by a first imaging sensor and displayed on a first display coupled to the first augmented reality device and position information of the first imaging sensor when the first reference point was captured.
6. The medium of embodiment 4, wherein the operations further include:
   aligning, by the computer system, the first reference point and the second reference point when generating the shared virtual space.
7. The medium of embodiment 2, wherein the first physical environment information includes a first virtual model of the first physical environment and the second physical environment information includes a second virtual model of the second physical environment.
8. The medium of any one of embodiments 1-7, wherein the operations further include:
   establishing, by the computer system, the remote multiparticipant augmented reality session via a network.
9. The medium of embodiment 8, wherein the establishing the remote multiparticipant augmented reality session includes establishing a peer-to-peer connection between the first augmented reality device and the second augmented reality device.
10. The medium of any one of embodiments 1-9, wherein the operations further comprise: receiving, by the computer system, updated coparticipant state information for the coparticipant controlled augmented reality object; and updating, by the computer system and based on the updated coparticipant state information for the coparticipant controlled augmented reality object, the coparticipant controlled augmented reality object with at least one visual change in a presentation of the coparticipant controlled augmented reality object on a display of at least one of the first augmented reality device or the second augmented reality device.
11. The medium of any one of embodiments 1-10, wherein the computer system includes at least one of the first augmented reality device or a server computing device.
12. The medium of any one of embodiments 1-11, wherein the operations further comprise: displaying, by the computer system, the shared virtual space with the populated augmented reality objects on a display of at least one of the first augmented reality device or the second augmented reality device.
13. The medium of embodiment 2, wherein the second physical environment information includes a virtual representation of a physical object in the second physical environment associated with the second augmented reality device, and wherein the virtual representation is mapped to the shared virtual space, and wherein the operations further comprise: populating, by the computer system, the virtual representation of the physical object with an augmented reality object representing that physical object; and displaying, by the computer system, the shared virtual space with the populated augmented reality objects including the augmented reality object representing the physical object on a first display of the first augmented reality device.

14. The medium of embodiment 13, wherein the augmented reality object representing the physical object provides constraints to the participant controlled augmented reality object controlled by the first augmented reality device.
15. The medium of any one of embodiments 1-14, wherein at least a second portion of the augmented reality objects includes a permissionless augmented reality object that is controllable by all participants of the remote multiparticipant augmented reality session.
16. The medium of embodiment 15, wherein the operations further comprise: changing, by the computer system and based on an update to the participant state information of the participant controlled augmented reality object, the permissionless augmented reality object to a permissioned augmented reality object controlled by a portion of the participants in the remote multiparticipant augmented reality session.
17. The medium of any one of embodiments 1-16, wherein at least a second portion of the augmented reality objects includes the participant controlled augmented reality object controlled by the participant of the first augmented reality device.
18. The medium of any one of embodiments 1-17, wherein at least a second portion of the augmented reality objects includes an augmented reality application permissioned augmented reality object controlled by an augmented reality application.
19. The medium of any one of embodiments 1-18, wherein the operations comprise steps for generating the shared virtual space.
20. A process comprising: the operations of any one of embodiments 1-19.
21. A system, comprising: one or more processors; and memory storing instructions that when executed by the processors cause the processors to effectuate operations comprising: the operations of any one of embodiments 1-19.

What is claimed is:

1. A non-transitory, machine-readable medium storing instructions that, when executed by one or more processors, effectuate operations comprising:
    establishing, by a computer system, a remote multiparticipant augmented reality session via a network, wherein establishing the remote multiparticipant augmented reality session includes establishing a peer-to-peer connection between a first augmented reality device and a second augmented reality device;
    providing, by the computer system and via the peer-to-peer connection, first state information for a participant controlled augmented reality object that is controlled by the first augmented reality device located in a first physical environment and that is viewed in the first physical environment via the first augmented reality device, to the second augmented reality device located in a second physical environment that is different than the first physical environment, wherein the first augmented reality device and the second augmented reality device are included in the remote multiparticipant augmented reality session;
    receiving, by the computer system and via the peer-to-peer connection, second state information for a coparticipant controlled augmented reality object associated with the second augmented reality device;
    providing, by the computer system, first physical environment information associated with the first physical environment that includes the first augmented reality device to the second augmented reality device that is included in the second physical environment;
    receiving, by the computer system, second physical environment information associated with the second physical environment from the second augmented reality device included in the remote multiparticipant augmented reality session;
    generating, by the computer system and using the first physical environment information and the second physical environment information, a shared virtual space, wherein the shared virtual space includes a plurality of virtual constraints determined from both the first physical environment information and the second physical environment information;
    overlaying, by the computer system, the shared virtual space in the first physical environment viewed by the first augmented reality device such that objects in the first physical environment are still visible via the first augmented reality device; and
    populating, by the computer system, the shared virtual space with augmented reality objects, wherein at least a portion of the augmented reality objects includes the coparticipant controlled augmented reality object controlled by the second augmented reality device according to the second state information and the participant controlled augmented reality object that is controlled and viewed in the first physical environment via the first augmented reality device, and wherein a virtual constraint of the plurality of virtual constraints that is generated based on the second physical environment information prevents movement of the participant controlled augmented reality object into a volume of the first physical environment even when a physical boundary of the first physical environment would permit movement of the participant controlled augmented reality object into the volume.

2. The medium of claim 1, wherein the operations further include:
    obtaining, by the computer system, the first physical environment information of the first physical environment for the remote multiparticipant augmented reality session that includes the first augmented reality device and the second augmented reality device.

3. The medium of claim 1, wherein the first physical environment information includes a first reference point selected within the first physical environment and the second physical environment information includes a second reference point selected within the second physical environment.

4. The medium of claim 3, wherein the operations further include:
    obtaining, by the computer system, the first reference point selected within the first physical environment captured by a first imaging sensor and displayed on a first display coupled to the first augmented reality device and position information of the first imaging sensor when the first reference point was captured.

5. The medium of claim 3, wherein the operations further include:
    aligning, by the computer system, the first reference point and the second reference point when generating the shared virtual space.

6. The medium of claim 1, wherein the first physical environment information includes a first virtual model of the first physical environment and the second physical environment information includes a second virtual model of the second physical environment.

7. The medium of claim 1, wherein the operations further comprise:
  receiving, by the computer system, updated second state information for the coparticipant controlled augmented reality object; and
  updating, by the computer system and based on the updated second state information for the coparticipant controlled augmented reality object, the coparticipant controlled augmented reality object with at least one visual change in a presentation of the coparticipant controlled augmented reality object on a display of at least one of the first augmented reality device or the second augmented reality device.

8. The medium of claim 1, wherein the computer system includes at least one of the first augmented reality device or a server computing device.

9. The medium of claim 1, wherein the operations further comprise:
  displaying, by the computer system, the shared virtual space with the populated augmented reality objects on a display of at least one of the first augmented reality device or the second augmented reality device.

10. The medium of claim 1, wherein the second physical environment information includes a virtual representation of a physical object in the second physical environment associated with the second augmented reality device, and wherein the virtual representation is mapped to the shared virtual space, and wherein the operations further comprise:
  populating, by the computer system, the virtual representation of the physical object with an augmented reality object representing that physical object; and
  displaying, by the computer system, the shared virtual space with the populated augmented reality objects including the augmented reality object representing the physical object on a first display of the first augmented reality device.

11. The medium of claim 10, wherein the augmented reality object representing the physical object provides constraints to the participant controlled augmented reality object controlled by the first augmented reality device.

12. The medium of claim 1, wherein at least a second portion of the augmented reality objects includes a permissionless augmented reality object that is controllable by all participants of the remote multiparticipant augmented reality session.

13. The medium of claim 12, wherein the operations further comprise:
  changing, by the computer system and based on an update to the first state information of the participant controlled augmented reality object, the permissionless augmented reality object to a permissioned augmented reality object controlled by a portion of the participants in the remote multiparticipant augmented reality session.

14. The medium of claim 1, wherein at least a second portion of the augmented reality objects includes the participant controlled augmented reality object controlled by the participant of the first augmented reality device.

15. The medium of claim 1, wherein at least a second portion of the augmented reality objects includes an augmented reality application permissioned augmented reality object controlled by an augmented reality application.

16. The medium of claim 1, wherein the operations comprise steps for generating the shared virtual space.

17. The medium of claim 1, wherein the operations further comprise:
  updating, by the computer system, the second state information for the coparticipant controlled augmented reality object, based on a change in the first state information for the participant controlled augmented reality object.

18. The medium of claim 1, wherein the operations further comprise:
  overlaying, by the computer system, the shared virtual space in the second physical environment viewed by the second augmented reality device such that objects in the second physical environment are still visible via the second augmented reality device; and
  populating, by the computer system, the shared virtual space with the augmented reality objects, wherein at least a portion of the augmented reality objects includes the participant controlled augmented reality object controlled by the first augmented reality device according to the first state information and the coparticipant controlled augmented reality object that is controlled and viewed in the second physical environment via the second augmented reality device.

19. A method, comprising:
  establishing, by a computer system, a remote multiparticipant augmented reality session via a network, wherein establishing the remote multiparticipant augmented reality session includes establishing a peer-to-peer connection between a first augmented reality device and a second augmented reality device;
  providing, by the computer system and via the peer-to-peer connection, first state information for a participant controlled augmented reality object that is controlled by the first augmented reality device located in a first physical environment and that is viewed in the first physical environment via the first augmented reality device, to the second augmented reality device located in a second physical environment that is different than the first physical environment, wherein the first augmented reality device and the second augmented reality device are included in the remote multiparticipant augmented reality session;
  receiving, by the computer system and via the peer-to-peer connection, second state information for a coparticipant controlled augmented reality object associated with the second augmented reality device;
  providing, by the computer system, first physical environment information associated with the first physical environment that includes the first augmented reality device to the second augmented reality device that is included in the second physical environment;
  receiving, by the computer system, second physical environment information associated with the second physical environment from the second augmented reality device included in the remote multiparticipant augmented reality session;
  generating, by the computer system and using the first physical environment information and the second physical environment information, a shared virtual space, wherein the shared virtual space includes a plurality of virtual constraints determined from both the first physical environment information and the second physical environment information;
  overlaying, by the computer system, the shared virtual space in the first physical environment viewed by the first augmented reality device such that objects in the first physical environment are still visible via the first augmented reality device; and populating, by the computer system, the shared virtual space with augmented reality objects, wherein at least a portion of the augmented reality objects includes the coparticipant controlled augmented reality object controlled by the second augmented reality device according to the second state information and the participant controlled augmented reality object that is controlled and viewed in the first physical environment via the first augmented reality device, and wherein a virtual constraint of the plurality of virtual constraints that is generated based on the second physical environment information prevents movement of the participant controlled augmented reality object into a volume of the first physical environment even when a physical boundary of the first physical environment would permit movement of the participant controlled augmented reality object into the volume.

* * * * *